United States Patent

[11] 3,573,379

[72] Inventors Donald W. Schmitz;
Benjamin Chandler Shaw, Granada Hills, Calif.
[21] Appl. No. 803,867
[22] Filed Mar. 3, 1969
[45] Patented Apr. 6, 1971
[73] Assignee The Bendix Corporation

[54] COMMUNICATIONS SYSTEM WITH FREQUENCY AND TIME DIVISION TECHNIQUES
17 Claims, 9 Drawing Figs.

[52] U.S. Cl. ........................................................ 179/15, 179/2.5
[51] Int. Cl. ........................................................ H04j 3/12
[50] Field of Search ........................................... 179/15, 15 (SSB), 15 (ASYNC), 15 (MM), 2 (DP), 2.5, 15 (SIG)

[56] References Cited

UNITED STATES PATENTS 3,239,761 3/1966 Goode ..................... 179/15X (Async)
3,261,922 7/1966 Edson ......................... 179/2X(DP)
3,485,953 12/1969 Norberg ...................... 179/15(Async)

*Primary Examiner*—Ralph D. Blakeslee
*Attorneys*—Robert C. Smith and Plante, Arens, Hartz, Hix and Smith

ABSTRACT: A communication system for a substantial number of subscribers is shown having random access capabilities without the requirement for the usual central exchange. The system uses a frequency division scheme for separating the several communication information channels. The individual subscriber units are interconnected as by means of one or more wires which are also connected to a master clock which continually generates time division digital information consisting of a plurality of pulses and unused time spaces (ones and zeros) including binary circuit code information and synchronizing pulses. A relatively limited band width is required for carrying this control information which is substantially displaced in frequency from the band containing the several communication information channels. These channels are generated by means of a frequency synthesizer in each of the subscriber units, each of which continually monitors the digital control information to determine whether its address is being called and the circuit code representing the channel of the incoming call. Similarly, outgoing calls are initiated by picking up a headset at the subscriber unit which causes an unused channel to be selected, inserting its circuit code into the digital stream and causing the frequency synthesizer in responding to this code to generate the corresponding carrier frequency. The audio information is then converted to single side band (or other) modulation of the particular carrier frequency signal.

INVENTORS.
B. CHANDLER SHAW
DONALD W. SCHMITZ
BY
Robert C. Smith
ATTORNEY

COMMUNICATIONS SYSTEM WITH FREQUENCY AND TIME DIVISION TECHNIQUES

BACKGROUND OF THE INVENTION

Communication systems for providing calling a capability among a substantial number of subscribers may be either wireless, wire-type, or a combination of these. In terms of operation, such systems are generally either random access types in which a central station continually monitors the subscriber units and connects the parties as desired, or network systems wherein access from the subscriber unit into the system is controlled by a master or "net control" station.

A typical telephone exchange is a random access system in which switching means are included in a central exchange for providing the desired connections between calling and called units. The central exchange must include means for scanning all the potential input terminals to determine which is asking to be connected, which addressee is being called, and then determining which of several available channels are open to provide the connection. This system may include means for providing time or frequency division such that each wire may carry a number of separate conversations. Even with these time and/or frequency division techniques, the amount of material and its cost and weight become substantial when a large number of subscriber units are involved. A large part of the overall complexity, size and weight of such systems is associated with the central exchange. A further disadvantage of such systems is that all subscriber units must connect directly with the central exchange before calls can be completed, and many subscribers may become isolated if a number of wires should happen to be shorted or become open, such as through storm damage or for other causes.

Some of the smaller communication systems, especially those without a central exchange, do not have the capability of communicating on a duplex basis; i.e., they require separate channels for each side of a conversation. Thus one cannot talk and listen on the same channel and must usually push a button to talk, during which time one cannot receive. It is much preferable to have duplex capability, of course, and to have this without the necessity for connecting the various subscriber units through a central exchange.

SUMMARY OF THE INVENTION

The present invention provides a self-contained communication system for use where a substantial number of subscriber units may be interconnected and which provides greater flexibility for random access than systems presently in use. The particular system described uses both time division and frequency division techniques with the individual channels being divided on a frequency basis and the control information including the address code, channel identification and, possibly, the calling station identification being supplied on a time division scheme. This technique has a basic advantage in reducing the number of interconnecting cables, but it may also be embodied in a grid interface arrangement where the loss of a large number of interconnecting wires will not cause the system to fail.

A typical system might be installed on a ship, but other applications will be apparent. In such case there are several types of operation with which the operators might be concerned. In addition to the telephone system, it may be desired to operate as a public address system, an intercommunication system between select subscriber units, or as a data system with simplex or duplex capability. Conferencing capability is inherent in this system; however, it can be limited to any extent. It is possible to interconnect the system with existing telephone systems, if desired.

By using a time division pulse code modulation scheme for handling control data, the bandwidth requirements may be held to a minimum while the advantages of noise immunity and flexibility are obtained. A definite frequency separation is provided between the control data and the data channels. It has been found that many channels can be provided in a reasonable bandwidth by using frequency division multiplexing with single sideband suppressed carrier modulation, while at the same time providing full duplex capability, very good flexibility and ease of mechanization.

The control data involves a preassigned code in which one or a plurality of interconnected master stations (or master clock stations) generate the desired digital information consisting of a series of bits or pulses and unused time spaces. Where a plurality of master stations are used, one will normally control the timing of all stations, but any master station may assume control in case of a failure of the previously controlling master station. A first group of bits may contain the circuit code (carrier frequency). Blank time spaces are then produced for later use by the individual subscriber units. Other bits in the chain may include a ring signal, and certain desired timing or synchronizing pulses. Thus the master station or stations continually and sequentially generate the digital pattern or bit stream containing synchronizing pulses, circuit codes and time spaces. When it is desired to place a call from a particular subscriber unit, the act of lifting the headset will cause activation of all the circuitry within the subscriber unit and cause the address recognition circuitry to scan the bit stream for one complete cycle or frame. At the beginning of the next cycle it inserts its address into a vacant word position, typically that having the lowest open circuit code number. The circuit code is then decoded, and the proper carrier frequency is generated by the frequency synthesizer within the subscriber unit.

Since the subscriber unit a has reserved a particular circuit code by inserting its address, no other subscriber unit may use this circuit code except for the special condition of conference calls. Any other subscriber unit attempting to call the aforementioned subscriber unit would get a "busy" signal since the calling unit's digital number now appears in the bit stream.

The next event which occurs in the calling sequence is that the caller inserts the address or number of the subscriber unit he is calling into the same word in the bit stream. The called subscriber unit, which has been monitoring the bit stream, recognizes its address in the "called" position of this word, decodes the associated circuit code and causes its frequency synthesizer to generate the proper carrier frequency, and activates its ringing circuit. Since the called station is now effectively on the line and its address code now appears on the bit stream, anyone else calling this number would get a "busy" signal. When the headset at the called address is lifted, all remaining circuitry within it is activated and its ringing circuit is deactivated. Since both the calling and called units are generating the same carrier frequency, a conversation may now occur in a normal manner.

Conference call capability is inherent and is easily mechanized. When a calling station gets a "busy" signal, it may decode the circuit code and generate the proper carrier frequency. The caller may then override the circuitry in his own subscriber unit which initiates the "busy" signal and enter the conversation. Any desired number of subscriber units may be given this capability.

In some systems it is desired to provide limited communication networks or channels such as for providing intercommunication among a number of stations for navigation and/or steering control, for cargo handling, etc. These units may not have the ability to dial any or all numbers, but are prewired to call a given address, and one of a limited number of such preassigned addresses would simply be selected by pushbutton. Conferencing may be made automatic since the "busy" lockout circuitry may be eliminated.

A public address system is easily integrated into the above described system. This is accomplished by deleting the duplex capability of those subscribers assigned this function. The calling subscriber would generate the address of the public address subscriber and a given circuit code. The public address subscriber would decode its address and generate the proper circuit code and simply demodulate the data.

Depending upon the type of installation, either one interconnecting wire or a large number of interconnecting wires with many common tie points may be used. In the latter (or grid) case, provisions may be made to isolate any subscriber unit which fails and to open any section of cable which incurs a short circuit. An open circuit at any point in the grid will not affect the operation of the remainder of the system so long as one master station is operative in the area.

DESCRIPTION OF THE PREFERRED EMBODIMENT

Figure 1A:
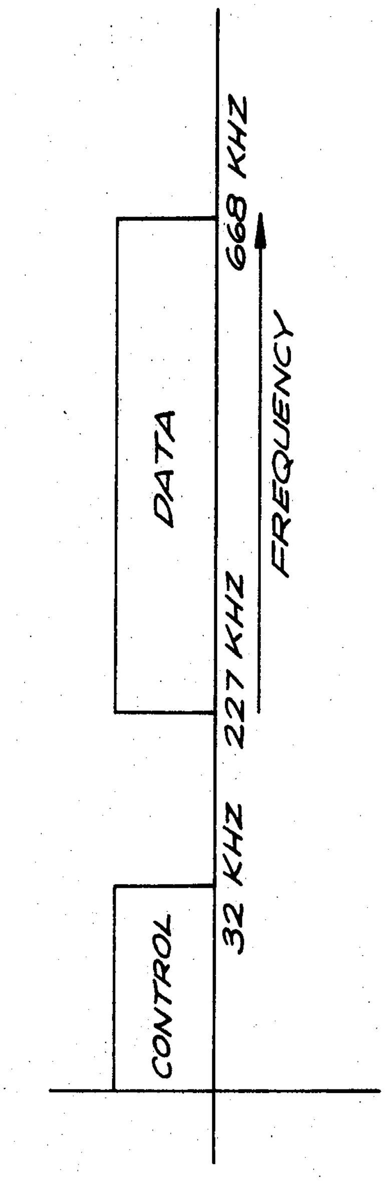
FIG. 1*a* is a graph showing typical frequency ranges used by the control and data information carried in this communication system and the separation between the ranges.

FIG. 1*a* is a graph showing two separate frequency ranges with increasing frequency plotted on the horizontal axis. In the block entitled "Control" is a passband of frequencies requiring approximately 32 kHz. of bandwidth and which, as set forth above, is available for all of the control functions of the system including the frame synchronization, word synchronization, circuit address, calling address, called address, rering, and other control features as may be desired. This passband includes all of the out puts of the master clock station and control functions of the subscriber units. This control data operates on the time division principle. The conversational data appears in a passband spaced substantially in frequency from the control data and, depending upon the number of subscriber units among other things, may typically occupy a passband such as 227 to 668 kHz.

Figure 1B:
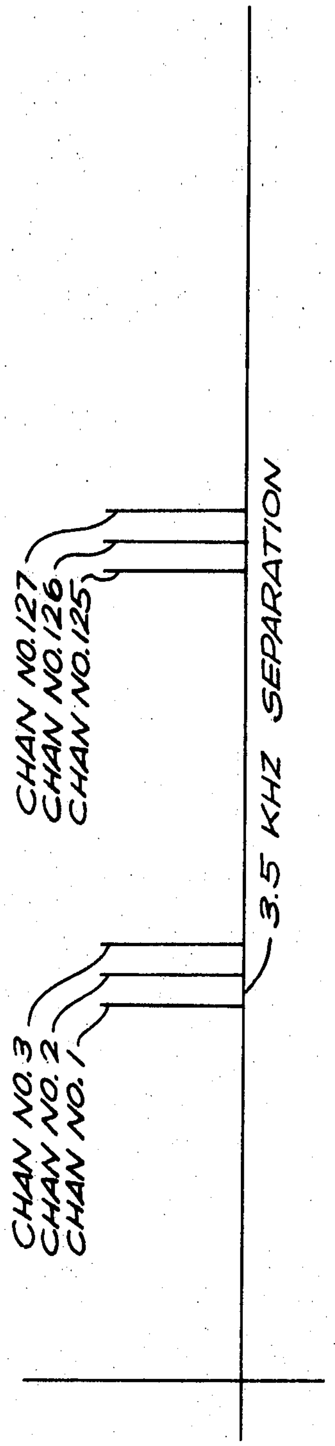
FIG. 1*b* is a graph showing typical frequency pass bands for the communication channels encompassed by the "data" band of FIG. 1*a*.

FIG. 1*b* shows a similar frequency diagram but indicating the manner in which the data or conversational passband is divided into a number of communication channels, each approximately 3.5 kHz. in total width. Each of these channels uses single sideband modulation, and each is assigned t a 1.2 kHz. guard band between it and the adjacent carriers.

Figure 2A:
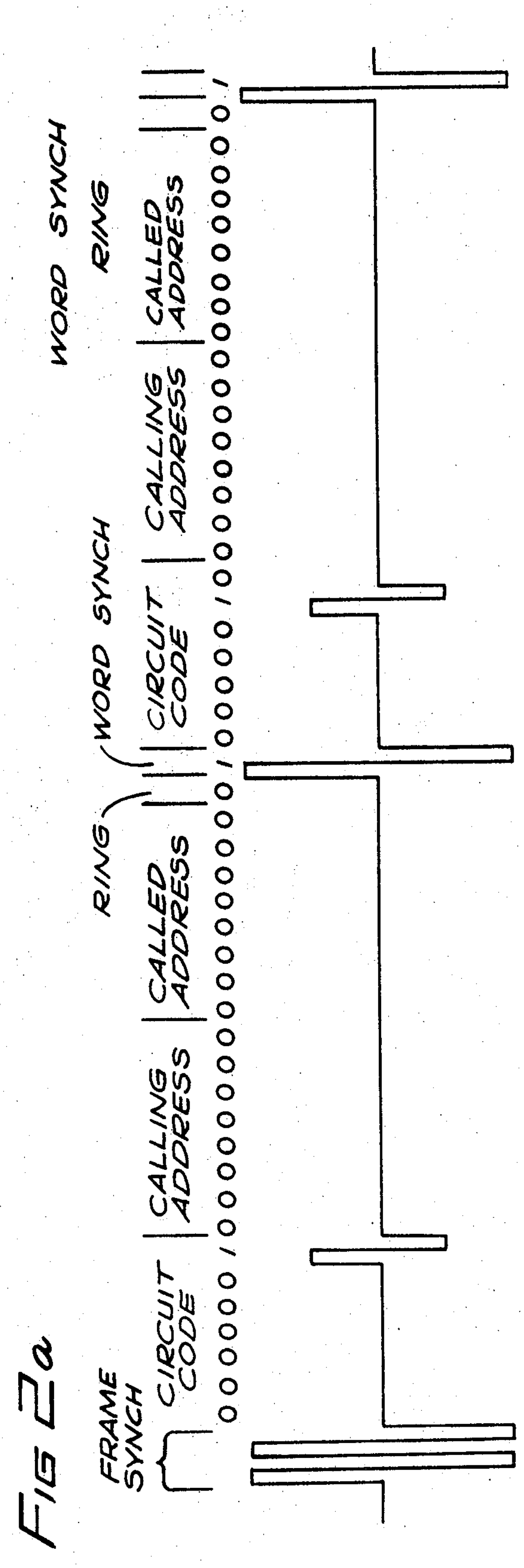
FIG. 2*a* is a graph showing the digital control data utilized in this communication system plotted on a time division basis and consisting of a plurality of pulses and open time spaces which in this figure represent a condition in which no call is carried.
Figure 2B:
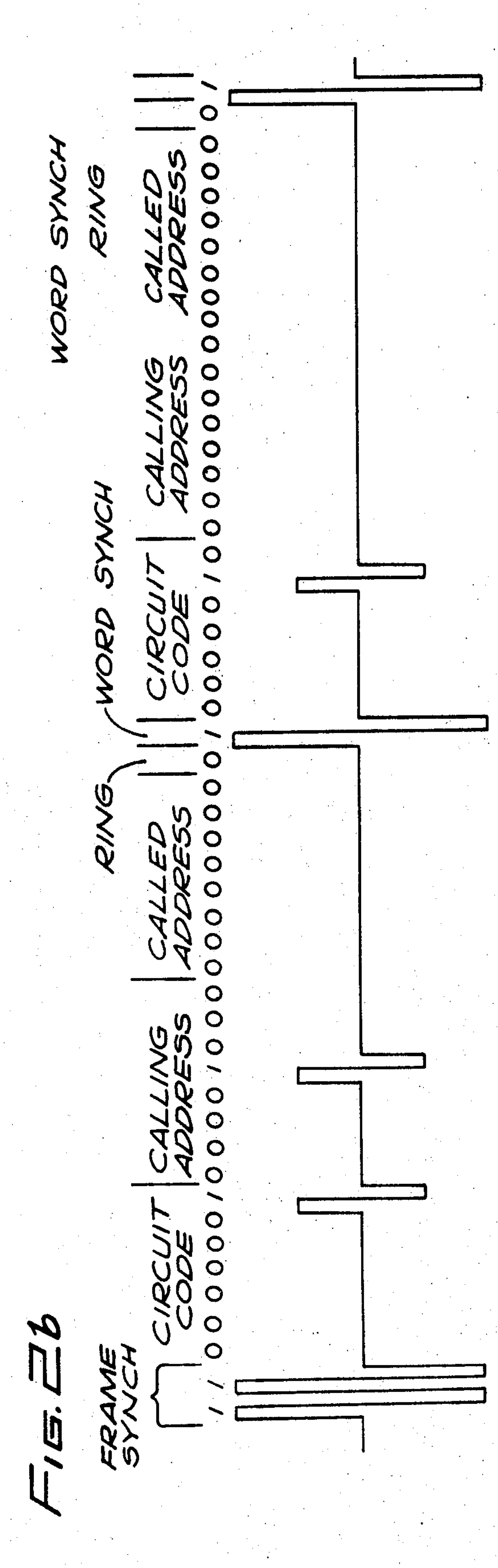
FIG. 2*b* is a graph similar to that of FIG. 1 but in which pulse information has been inserted constituting a calling address for a specific subscriber station.
Figure 2C:
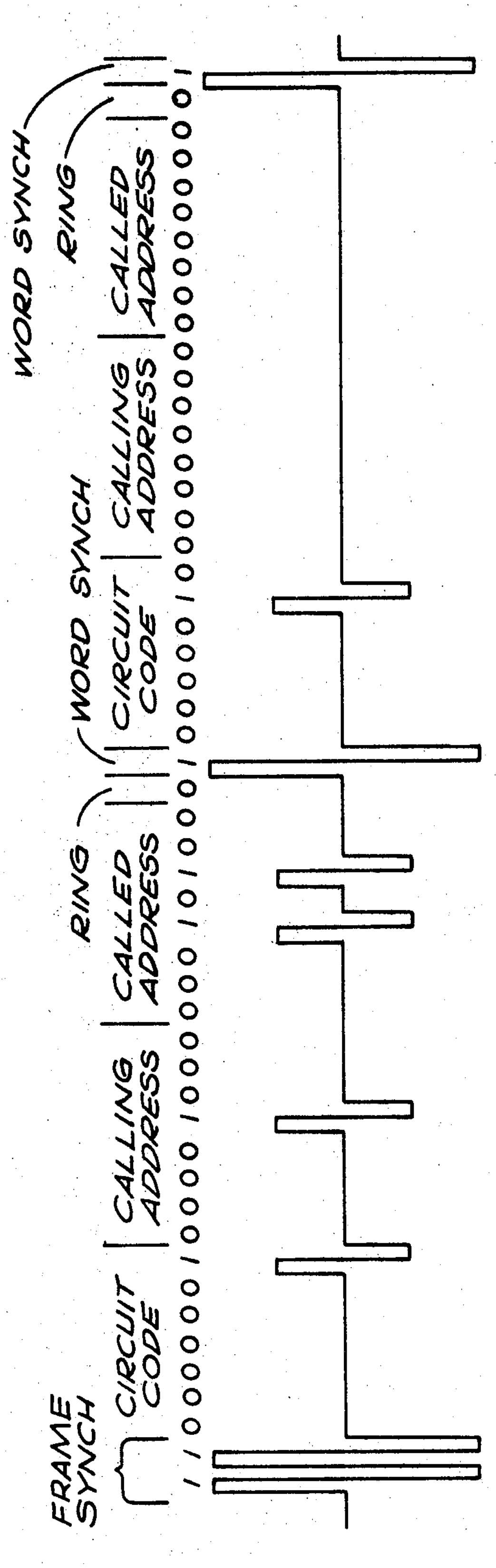
FIG. 2*c* is a graph similar to that of FIG. 2*b* in which additional pulse information identifying a particular called address has been inserted into the bit stream.

FIGS. 2*a*, 2*b* and 2*c* are graphs representative of typical waveform outputs from the master clock station and which are representative of different calling conditions. FIG. 2*a* shows the frame which would appear under those circumstances in which the system is not being used. This particular graph represents two words of the frame and shows the frame synchronizing pulses on the left and word synchronizing pulses in the center and at the right. The circuit codes are being assigned sequentially, and all "calling" and "called" addresses contain "zero." All subscriber units within the system are synchronized with this bit stream. To conserve power, the only active circuitry at each subscriber unit is its power supply, synchronizing circuits and address recognition circuits. All other circuitry, such as oscillators, frequency synthesizer, audio amplifiers, etc., are off.

A given subscriber unit is activated by lifting its headset. At that moment, a variety of events take place. First, all circuitry within the subscriber unit is activated. Secondly, the address recognition circuitry examines the wave train for one full frame. At the beginning of the second full frame, it inserts its address (the calling station) into the word position which has the lowest open circuit code number. FIG. 2*b* shows that a pulse input is applied in the time space for calling address, and this particular pulse input is representative of station or calling address No. 8. This address which is now carried in the bit stream indicates that this station is busy.

In this case, calling address No. 8 is inserted into the word-containing circuit code No. 1. The circuit is code is decoded, and the proper carrier frequency is generated by the frequency synthesizer within subscriber unit No. 8.

The next major event in the calling sequence occurs when the operator at station No. 8 inserts the address or number of station he is calling (for example, station No. 20) This address is inserted into the same word in the bit stream. Several methods may be used to accomplish this action. If the subscriber unit is a telephone station, push buttons (or a dial) may be used. If the subscriber unit happens to be used as an intercom station, the address may be inserted by a single precoded button (see FIG. 2*c*). This FIG. shows that circuit code No. 1 has been occupied and that calling address No. 8 is calling called address No. 20.

When the called station (No. 20), which like all other subscriber units has been monitoring the bit stream, sees its address come up in the "called" position of a word, it decodes the associated circuit code (No. 1) and generates the proper carrier frequency. Its ringing circuit is then activated. At this time, several other events occur within the system. First, any other station trying to call Station No. 20 would get a "busy" signal since the digital number 20 appears within the wave train in the "called" position. If station No. 20 were busy, subscriber unit No. 8 would have seen the number 20 within the wave train and generated a "busy" signal within itself. The last major event in this calling sequence occurs when station No. 20 has its headset lifted from its cradle. At this point all remaining circuitry within this station is activated, the ringing circuit is deactivated, and the conversation may occur in a normal fashion.

Figure 3:
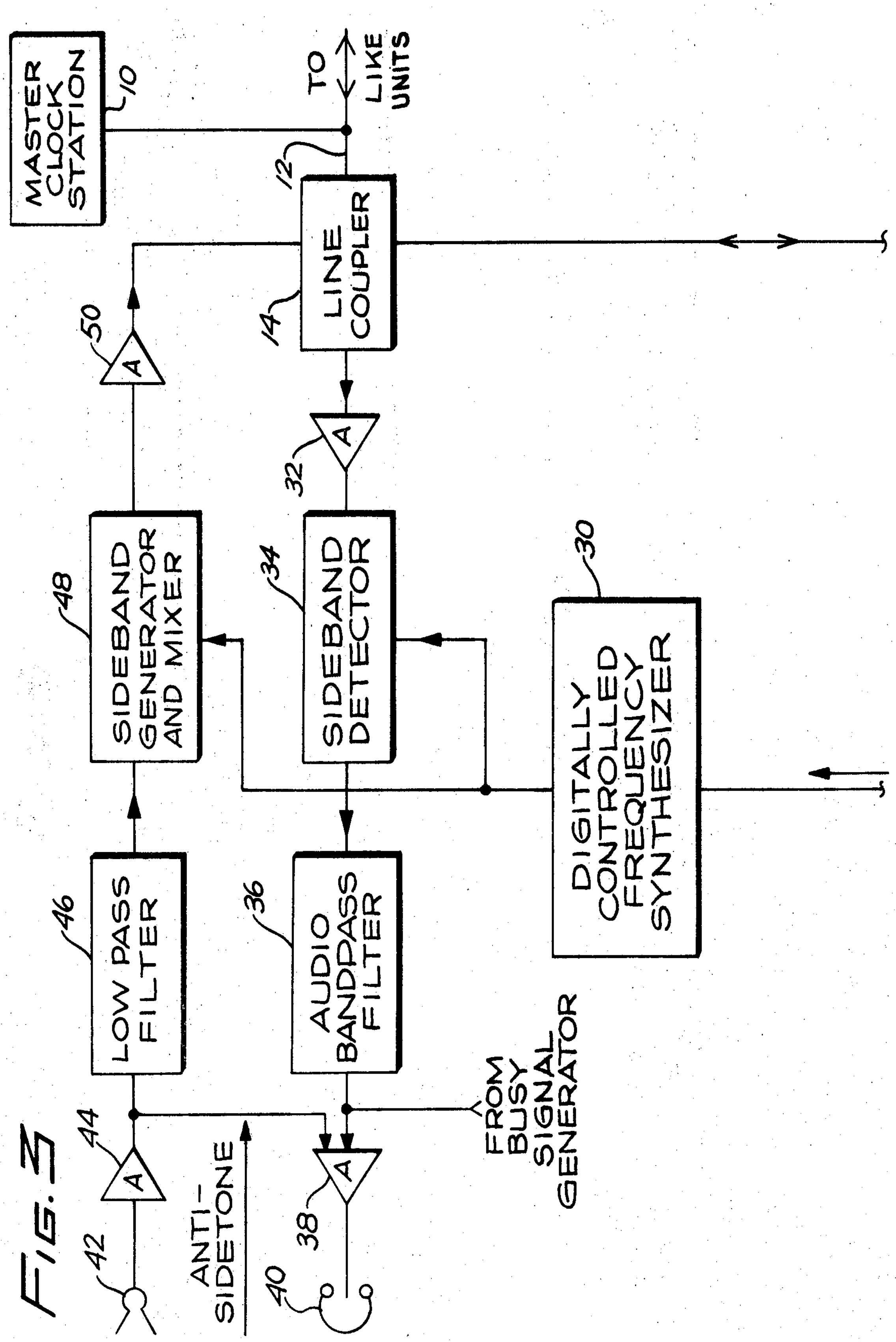
FIG. 3 is a portion of a block diagram showing at a typical subscriber unit which may be one of many in the communication system.
Figure 3A:
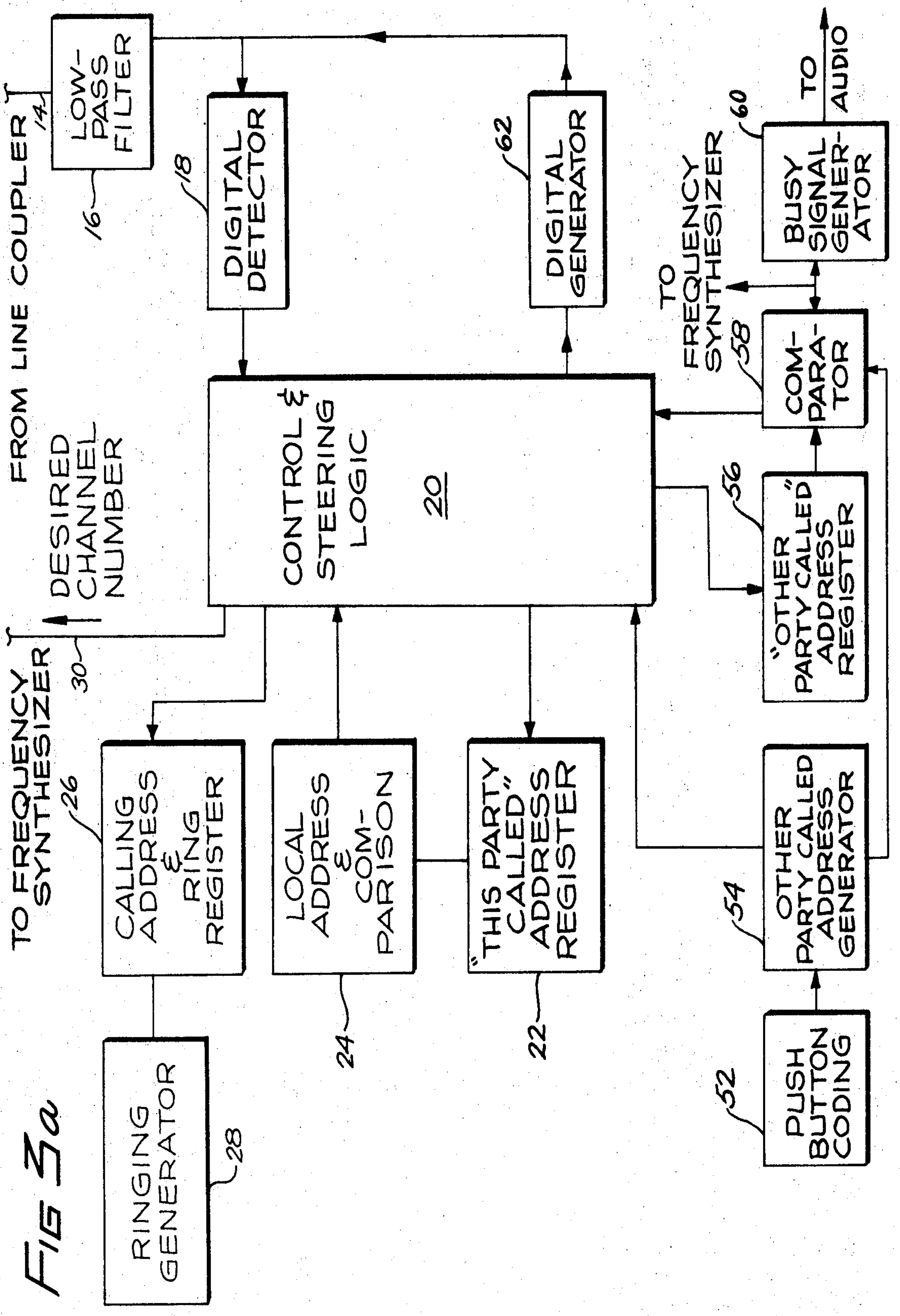
FIG. 3*a* is the remaining part of the block diagram partially shown in FIG. 3.

A typical subscriber unit is shown in block diagram in FIGS. 3 and 3*a*. This subscriber unit will be connected in common with a number of similar units to a master station 10 which generates the timing information as described above. The subscriber unit is connected to the output line 12 by means of a line coupler 14, which may also contain a circuit breaker for removing the unit from the line in case of a short circuit or other overload. The line coupler 14 is connected to a low pass filter 16 (FIG. 3*a*) whose function is to discriminate against the frequency band containing the audio information and to pass the lower frequency digital control information. This information is supplied through a digital detector 18 to the control and steering logic circuit 20. The digital detector 18, which may be any of several circuits well known in the art, primarily functions to distinguish between zeros and ones in the input and to supply a proper digital input through the control and steering logic system 20. A bit synchronizer forming part of the digital detector maintains synchronization with the incoming signals, and the control and steering logic 20 will then steer the address portions of each data word into the "This party called" address register 22 at the end of each word. This signal is compared with the local address in a comparison circuit 24, and if this unit determines that its address is being called, power will be provided to the audio amplifiers and synthesizer. The control and steering logic will energize the calling address and ring register 26, enter the calling address and energize the ringing generator 28 to attract local attention. Simultaneously the circuit code number information is processed by the frequency synthesizer 30 to generate a proper carrier frequency for this call.

The control information having been separated from the incoming signal by means of a low pass filter 16, the incoming single sideband signals for the desired channel will enter a buffer amplifier 32 and from there will enter the sideband detector 34 which also receives an input from the frequency synthesizer 30. In sideband detector 34 the input signal is mixed with the carrier signal to regenerate an audio output which corresponds to the original audio of the incoming signal. The output of the sideband detector 34 is supplied to an audioband pass filter 36, is amplified in an audio amplifier 38, and applied to actuate the local reproducer which in this case is shown as earphones 40.

Replies to the call will be picked up locally by a microphone 42 whose output is amplified in an amplifier 44 which may also contain compressor features to eliminate the effect of differing voices, voice gain or distance to the microphone. The output of this amplifier is then supplied to a low pass filter 46 and from thence to a sideband generator and mixer 48 which also receives an input from the frequency synthesizer 30, generating an audio modulated single sideband carrier which is amplified in amplifier 50 and supplied to the transmission line 12 through the line coupler 14. If it is found necessary or desirable, a portion of the output of amplifier 44 may be connected to the input of audio amplifier 38 in such manner that it is out of phase with the received channel to eliminate the effects of side tone, which in some instances can create audio "-howl."

When the call is originated from the illustrated terminal unit, a hook switch (not shown) is activated by lifting the microphone or hand set which applies power to the audio and synthesizer systems. The local address is immediately inserted in a blank word in the data frame which is the lowest available circuit code determined by the control and steering logic circuits 20. Simultaneously, the control and steering logic 20 has examined the wave train passing low pass filter 16 for the lowest circuit number available and has set up the local frequency synthesizer to generate this carrier for use in the subsequent transmissions. When the called address is entered, such as by means of a conventional telephone dial or a pushbutton coding device 52, the called address generator 54 generates the digital signal corresponding to the required address. This address is applied to control and steering logic circuits 20 which route it to the "other party called" address register 56. Address register 56 receives all of the addresses in the control wave train, and if the other party's address is presently in use a valid comparison is made in comparator 58 with the output of the address generator 54 which then actuates the busy signal generator 60. When the busy signal generator 60 is actuated, it will produce an output to the audio amplifier 38 which informs the caller that the called station is "busy." An inhibit signal is also sent to the frequency synthesizer to prevent the call from being placed on the line 12. If no busy signal is generated, the control and steering logic drives a digital transmitter 62 with the signal from the called address generator 54, and this signal is then inserted into the data frame carried on line 12. For conference calls, the busy signal generator may simply be deactivated, and the calling station will be placed on the same channel with the other parties.

The called part subscriber unit will then be activated in the same manner as described above, and a ringing signal will be generated. Since the called part generates the same carrier frequency for communication as the calling party, the communication between (or among) them will be on the same channel, and no rearrangement of the frequency synthesizer will be required during any one particular call.

Figure 4:
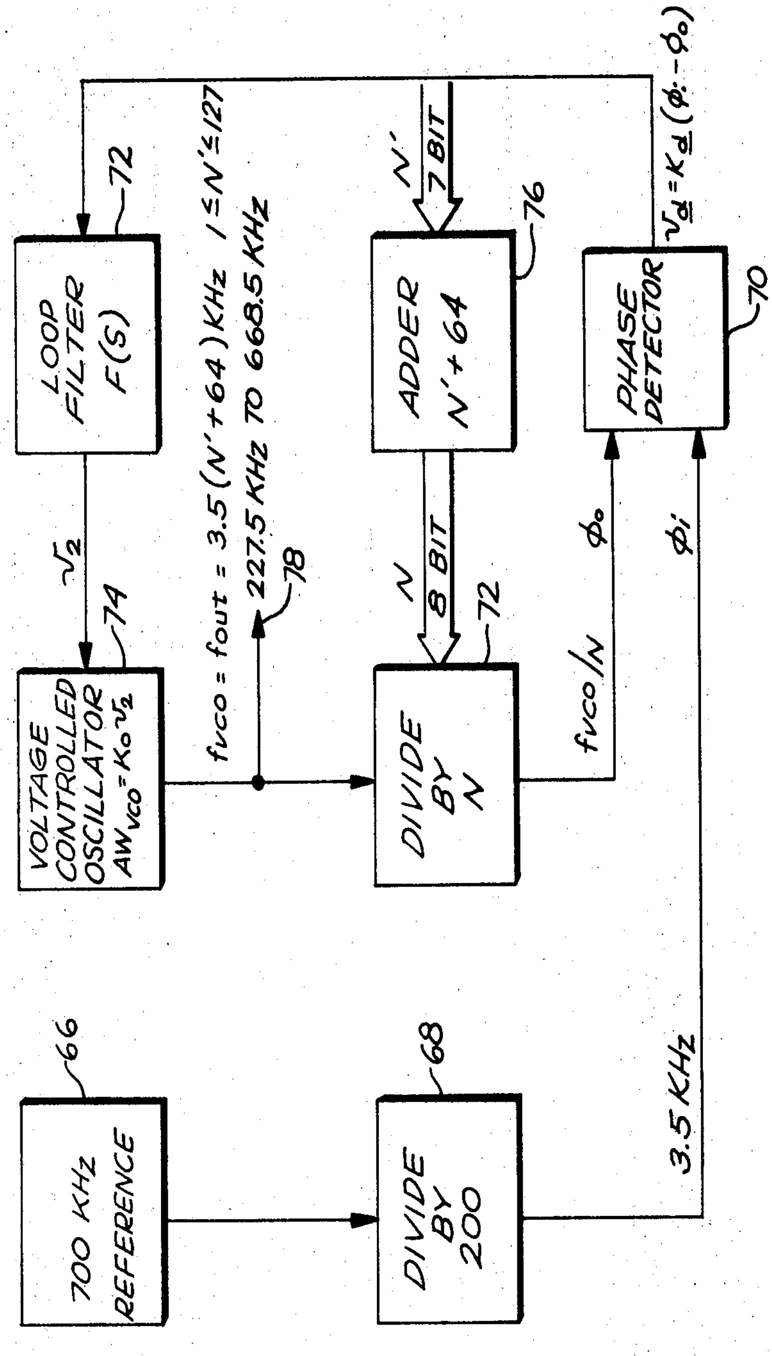
FIG. 4 is a block diagram of a frequency synthesizer forming part of the subscriber unit shown in FIG. 3.

A block diagram of the frequency synthesizer 30 appears in FIG. 4. This synthesizer is used to produce any one of the several different frequencies for the generation and detection of the separate single sideband channels. Other known synthesizers could also be used. The several channels are, or may be, spaced at intervals such as 3.5 kHz. over a frequency range such as that from 227.5 to 668.5 kHz. The only frequency reference which is used is a 700 kHz. (or multiple thereof) pilot frequency generated locally in each subscriber unit and shown in block 66. Alternatively the pilot frequency may be generated by the master station and transmitted to all stations. This frequency may be produced by a conventional crystal-controlled oscillator whose output may be shaped as desired for processing by means of a "divide by 200" divider 68 which may use conventional frequency division techniques. The output of this divider would then be an alternating voltage of 3.5 kHz. frequency which is supplied to a phase detector 70 which provides a phase comparison between this signal and an input from a divider circuit 72, producing an error voltage as a result of the comparison of the phases of its two inputs, which error voltage is then integrated by a loop filter 72. This integrated error voltage signal is then supplied as a control voltage to a voltage control oscillator 74. The output of the voltage-controlled oscillator is supplied to a frequency divider 72 which also receives as an input a signal from an adder circuit 76.

The control data chain includes a circuit code word consisting of a 7-bit binary number ranging from one up to the maximum number of available channels. In order to cover the desired frequency range, a constant must be added to the channel select number. One convenient number which has been selected is 64, and this number is this number is added in the adder circuit 76 to the channel selection number resulting in values of N from 65 to 64 plus the total number of channels. This sum will then result in an eight-bit number being supplied to the divider circuit 72 which divides the output of the voltage-controlled oscillator 74 in a conventional manner to result in the desired carrier frequency. Thus the frequency synthesizer 30 is enabled to produce any of a large number of communication channels 3.5 kHz. apart, the output being taken at a terminal 78 from the voltage-controlled oscillator 74. Other channel separations may be obtained by using different pilot frequencies or different dividers.

Figure 5:
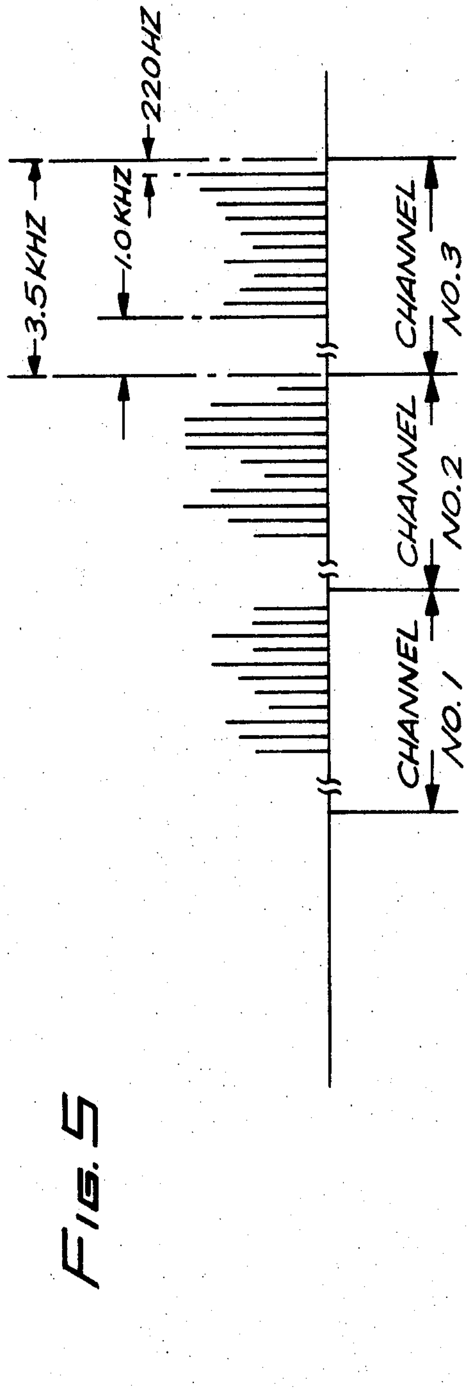
FIG. 5 is a graph showing the frequency spectrum of a plurality of adjacent channels including single sideband modulation and the guard band between channels.

FIG. 5 indicates the general configuration of the single sideband spectrum. As shown, each conversation is assigned a unique frequency spectrum, and each has a 1.2 kHz. guard band between it and its adjacent carriers. The digital information may be transmitted by any of a number of formats and may be transmitted either base band or on a pilot carrier of its own. Although single sideband modulation has been described herein because, among other things, it is economical of bandwidth, many other conventional modulation schemes may be used depending upon the severity of the bandwidth limitations, the number of subscriber units, etc. Other known sideband generators may be used, such as filter-type or simultaneous phase-amplitude sideband generators.

While the present system has been described in terms of a relatively simple system having a limited number of subscribers connected to a common line or a grid, for a substantially larger system it may be desirable to arrange the synthesizer to generate simultaneously a pair of frequencies, one for each of the transmitting and receiving modes to reduce "in channel loading" and avoid sidetone problems. This may be used either with or without separate lines for each of the transmitting and receiving modes with the master station or stations providing coupling between the two lines. The two-line system would, of course, reduce the loading to approximately half what it would be for a single line, thus reducing the amount of amplifier power required for each subscriber unit.

It will therefore be appreciated that applicants have disclosed herein a communications system in which random access is provided but without requiring the central office as such. Through the use of the combined time and frequency division techniques the control data is easily and clearly separated from the message data. While a single master clock station is shown, it will be recognized that in a large system a number of such stations may be supplied at various locations, all of which will be maintained in synchronization with each other. It will also be appreciated that while the subscriber unit described in detail in FIG. 3 would be typical, simplified subscriber units may be used for intercommunication systems or public address systems. In such case, the busy signal generator might be eliminated and the units in a common intercommunication system would all have inherent conferencing capability. Additionally, it may be desired to provide conferencing capability by permitting the individual subscriber units to override their busy signal generators to come onto the line at the same carrier frequency with two or more other stations simultaneously.

We claim:

1. A communication system for providing communication among a plurality of individual subscriber units comprising:
- at least one interconnecting conductor connecting said units together,
- a master clock station connected to said conductor for continually providing time division digital information to said conductor, said information including a bit stream containing at least circuit code and synchronizing pulses; and
- said subscriber units containing means generating an address code, a frequency synthesizer capable of generating any of a plurality of communication channels and means connecting said bit stream to said synthesizer such that for receiving incoming calls said bit stream is continually monitored to determine whether the address code of said individual subscriber unit is being called and which of said channels the incoming call is using and for generating the carrier frequency corresponding to said channel, and for placing calls, said bit stream is monitored to find a circuit code indicating an unused channel, said channel is selected causing said circuit code to be changed to indicate that said channel is in use, and said frequency synthesizer is caused to generate a carrier frequency corresponding to said selected channel.

2. A communication system as set forth in claim 1 wherein said channels carry information in the form of single sideband modulation.

3. A communication system for providing communication among a plurality of individual subscriber units comprising:
- at least one interconnecting conductor connecting said units together; and
- frequency generating means in said subscriber units for generating carrier frequencies corresponding to any of a number of desired channels;
- a master clock connected to said conductor for continually generating and providing time division digital information to said conductor for continually generating and providing time division digital information to said subscriber units including at least a circuit code for selecting one of said channels; and
- means in each of said subscriber units for selecting an address code for a called subscriber unit, for continually monitoring said digital information to determine whether the individual unit's address is being called, for identifying the circuit code of the incoming call, and for activating its frequency-generating means at the proper frequency corresponding to the frequency of the incoming call.

4. A communication system as set forth in claim 3 wherein each subscriber unit has a calling address code, and we when a call is placed from said unit said calling address code is added to said digital information on said conductor.

5. A communication system as set forth in claim 3 wherein said digital information includes synchronizing pulses and a calling address code.

6. A communication system as set forth in claim 3 wherein said interconnecting conductor includes a plurality of interconnecting wires all connected to said master clock.

7. A communication system as set forth in claim 3 wherein said channels each constitute single sideband modulation of one of said carrier frequencies.

8. A communication system for providing random access communication among a plurality of individual subscriber units comprising:
- at least one interconnecting communication path connecting said units together;
- means operatively connected to said communication path and continually operative over a first frequency range for generating coding information uniquely identifying any of a plurality of communication channels;
- monitoring means in each of said subscriber units continually receiving said coding information including means capable of recognizing the code of any communication channel; and
- means in each of said subscriber units and operative over a second frequency a range for generating any of said communication channels.

9. A communication system as set forth in claim 8 wherein each of said subscriber units includes means for inserting a called address code into said coding information and said channel generating means operates in response to receiving coding information containing its address code to effectively connect its subscriber unit to said communication path.

10. A communication system as set forth in claim 8 wherein each of said subscriber units includes means monitoring said coding information to identify an unused channel, for selecting said channel and for causing said generating means to generate said unused channel.

11. A communication system as set forth in claim 8 wherein said communication path includes at least one electrical conductor.

12. A communication system as set forth in claim 8 wherein said communication channels constitute a plurality of carrier frequencies.

13. A communication system as set forth in claim 12 wherein said carrier frequencies are single sideband modulated and a band of unused frequencies is interposed between each of said channels.

14. A communication system as set forth in claim 8 wherein said communication path includes a substantial number of paralleled electrical conductors and means are provided for isolating any of said subscriber units which incur a short circuit.

15. A communication system as set forth in claim 8 wherein said coding information includes electrical pulses arranged in a digital word format and timing and synchronizing pulses are included.

16. For use with a system providing random access communication among a plurality of subscriber units connected to a common conductor and wherein a master clock continually provides digital control data on a time division basis to said conductor constituting a bit stream containing at least synchronizing pulses and circuit codes for identifying any of several communication channels:
- a subscriber unit including means coupling said unit to said conductor;
- means responsive to initiation of a call from said unit for selecting a vacant channel and for varying said bit stream to indicate that said channel is in use;
- means operative to insert a called address code into said bit stream;
- means continually monitoring said bit stream to determine whether the address code of said subscriber unit is being called,
- a frequency synthesizer capable of generating any of a plurality of carrier frequencies defining said communication channels; and
- means responsive to recognition of said vacant channel or of its called address and address code for actuating said frequency synthesizer.

17. A communication system as set forth in claim 16 wherein:
- said frequency synthesizer includes a stable oscillator;
- a first frequency dividing circuit for dividing the output of said stable oscillator into a lower frequency constituting a passband for said individual channels;
- a voltage controlled oscillator;

a second frequency dividing circuit for dividing the frequency output of said voltage controlled oscillator by an integer;

an adder circuit connected to said second frequency dividing circuit responsive to the signal representing the circuit code portion of said bit stream and for adding said signal to a signal representative of another number to produce a signal representing said it integer;

a phase detector connected to receive the outputs of said first and second divider circuits and for producing an output voltage varying with the phase difference between the outputs of said divider circuits; and means filtering said phase detector output and connecting said filtered output to said voltage-controlled oscillator.